July 11, 1933.          C. A. McMANUS            1,917,805
                         CATCH BASIN TRAP
                         Filed July 6, 1931        2 Sheets-Sheet 1

Inventor

Clarence A. McManus

By *Clarence A. O'Brien*
                              Attorney

July 11, 1933.   C. A. McMANUS   1,917,805
CATCH BASIN TRAP
Filed July 6, 1931   2 Sheets-Sheet 2

Inventor
Clarence A. McManus
By Clarence A. O'Brien
Attorney

Patented July 11, 1933

1,917,805

UNITED STATES PATENT OFFICE

CLARENCE A. McMANUS, OF ALBANY, NEW YORK

CATCH BASIN TRAP

Application filed July 6, 1931. Serial No. 549,004.

This invention relates to a new and improved trap for use in the catch basin of a sewer construction.

My principal aim is to generally improve upon traps of this general class by providing one of novel configuration and construction characterized by an appropriately designed and located casing, a pressure controlled check valve, and a grille-like slidable closure at the intake end of the casing.

The improved trap has two noteworthy advantages over the present day basin traps in that it includes an appropriately arranged and located check valve which permits the flow of fluid from the basin to the discharge conduit and automatically closes at a predetermined time and prevents the discharge of obnoxious gas from the conduit into the basin.

Secondly, the provision of the inclined slidable grille-like closing guard is arranged to prevent large sticks, paper, and extraneous matter from entering the trap, whereby to insure unobstructed effluent fluid action in said trap.

Other features and advantages will become more readily apparent from the following description and drawings.

Figure 1:
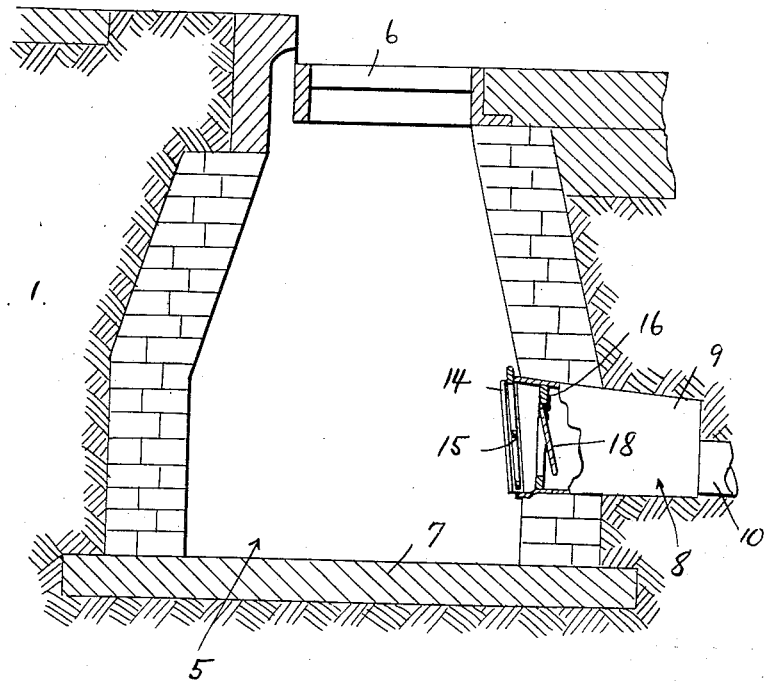
Figure 1 is a view in section and elevation showing the trap mounted for operation in the catch basin or sewer.
Figure 4:
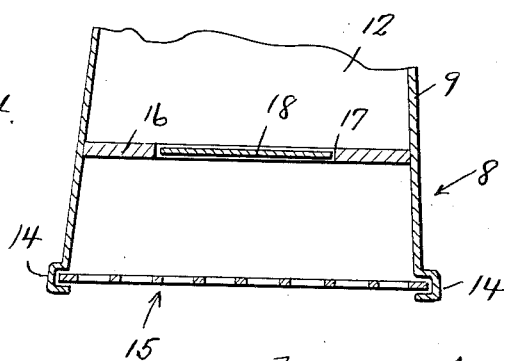
Figure 4 is a horizontal section on the line 4—4 of Figure 2.

In the drawings, the brick walled base or sewer is designated by the numeral 5 and this may be of any appropriate construction. At the top is the customary street grating 6. The improved trap is mounted above the bottom 7 and is generally designated by the numeral 8. It comprises a cast box-like casing 9 having spaced parallel side walls being open at the left hand end and provided at the right hand end with a reducing nipple 10 forming a part of the discharge conduit.

Figure 2:
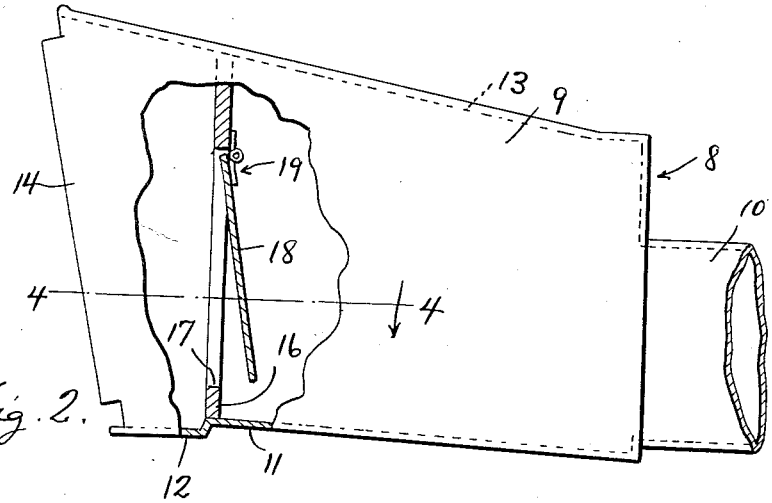
Figure 2 is an enlarged elevational and sectional view with the slidable guard removed.
Figure 3:
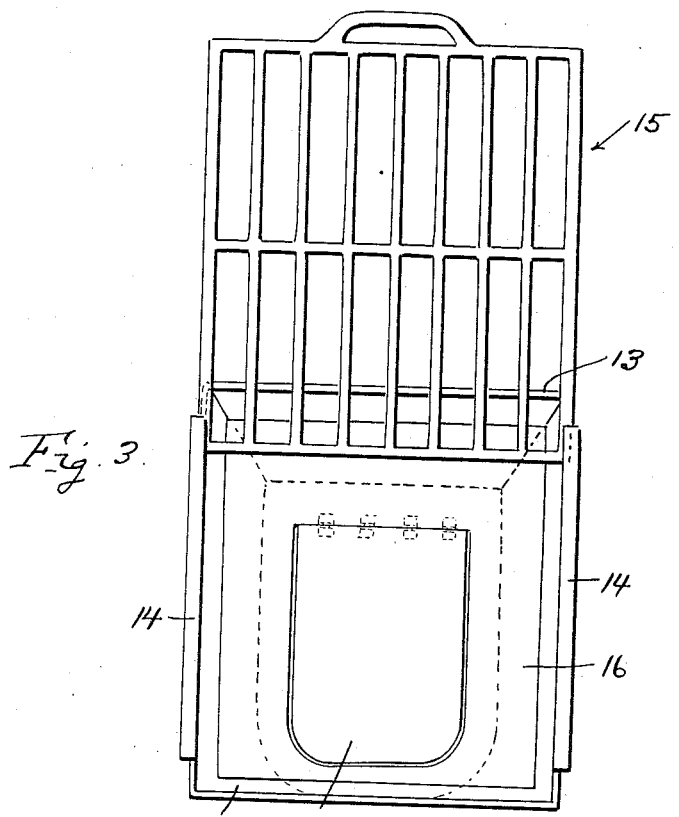
Figure 3 is a front view with the guard in elevated position.

The bottom of this casing is substantially flat and horizontal as indicated at 11 except the front end portion which is offset downwardly to the approximate degree represented at 12 in Figure 2. The top wall 13 is inclined upwardly and extends to a point beyond the intake end of the bottom 11. This makes the forward or intake end of the casing of such configuration as to slant downwardly.

The side walls are formed with open ended retaining channels 14 adapted to accommodate the slidable guard 15. As before stated, this guard is in the form of a multiple bar grille. Supported within the casing and spaced from the guard 15 and located at the juncture of the portions 11 and 12 in Figure 2 is a partitioning frame 16 having an aperture 17 to allow passage of the sewage.

Mounted in this opening 17 is a check valve plate or door 18 supported on hinges 19, and adapted to swing in a direction from left to right when moving to an open position with the parts 17 and 18 preferably of brass. The check valve action of this door 18 is important in that it allows the sewage to flow into the conduit unobstructed when sufficient pressure and force is built up into said fluid. Moreover, it allows the door to swing by gravity and gas pressure to closing position to trap obnoxious air and gases and to prevent the discharge thereof into the main basin 5.

The improved valved grille equipped trap is supported in the wall of the basin as indicated in Figure 1 at a point above the bottom 7 so that when the sewage assumes the proper elevation it will flow out through the trap. When the sewage recedes the backing pressure developed by the gas and air in the discharge conduit together with the gravity action of the valve plate itself causes said plate to swing to normally closed position.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, a casing adapted to be arranged horizontally and having a substantially horizontal bottom wall and a top wall inclined with respect to the bottom wall, said casing being provided with an inlet end and with side walls connecting the top and bottom walls and increasing in height toward the inlet end of the casing, the ends of said side walls at the inlet end of the casing being inclined at an obtuse angle to the bottom wall of the casing and provided with inclined guides, a guard carried by said inclined guides and disposed at an obtuse angle to the plane of said bottom wall, the bottom wall of said casing being offset downwardly at the inlet end of the casing and being in the path of descent of said guard to constitute a stop therefor, and a check valve arranged within said casing in spaced relation to said guard, said guard being removable upwardly from the inlet end of said casing.

2. A trap for catch basins comprising a casing having an outlet at one end and means at said other end for connecting it with a sewer main, and also tapering longitudinally from its inlet to said other end; said casing having an inclined top wall and a substantially horizontal imperforate bottom wall, said bottom wall having a front portion and a rear portion, the front portion being in a plane below the plane of said rear portion, a frame mounted in the casing perpendicularly to said bottom wall at the junction of the front and rear portions thereof, a vertically swinging door hingedly mounted on the frame; a slidably mounted grille at the inlet end of the casing, and inclined guides for the grille at relatively opposite sides of the casing.

In testimony whereof I affix my signature.

CLARENCE A. McMANUS.